July 19, 1960
H. K. DEARBORN
2,945,428
CAMERA STABILIZER
Filed March 24, 1958
3 Sheets-Sheet 1
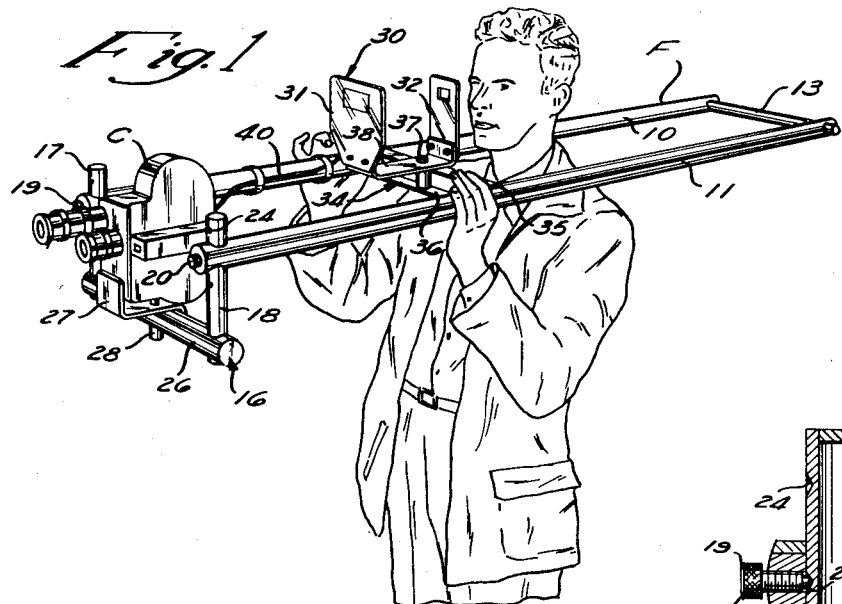
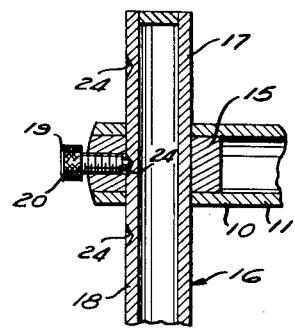
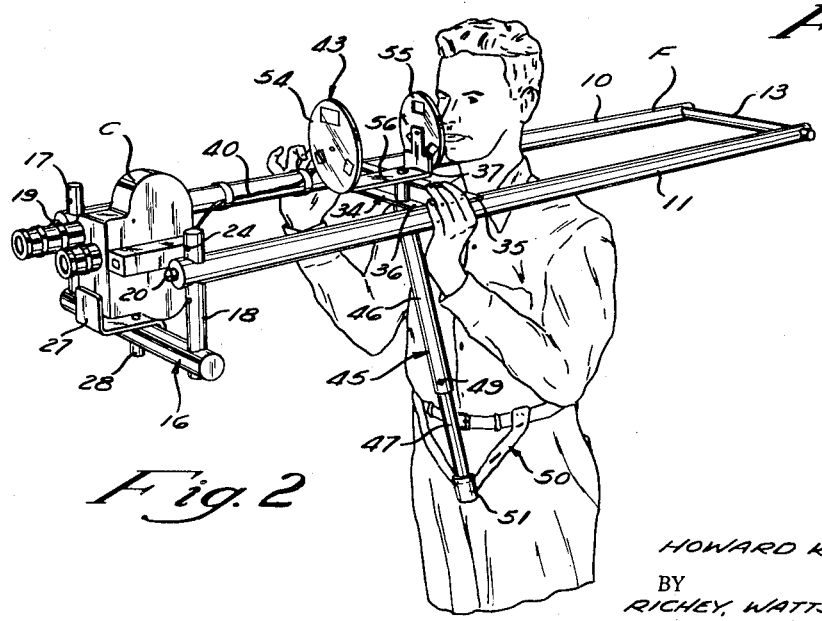
INVENTOR.
HOWARD K. DEARBORN
BY
RICHEY, WATTS, EDGERTON,
McNENNY & FARRINGTON
ATTORNEYS July 19, 1960  H. K. DEARBORN  2,945,428
CAMERA STABILIZER
Filed March 24, 1958  3 Sheets-Sheet 2
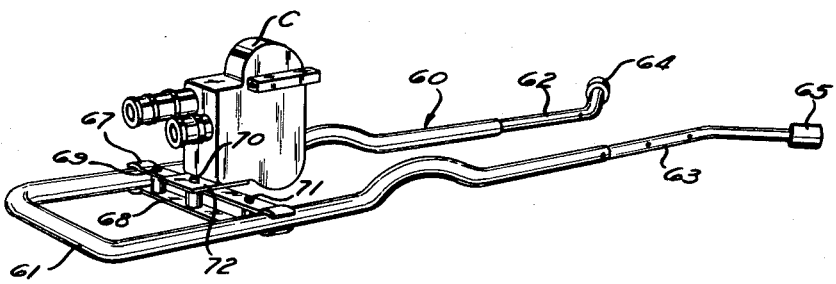
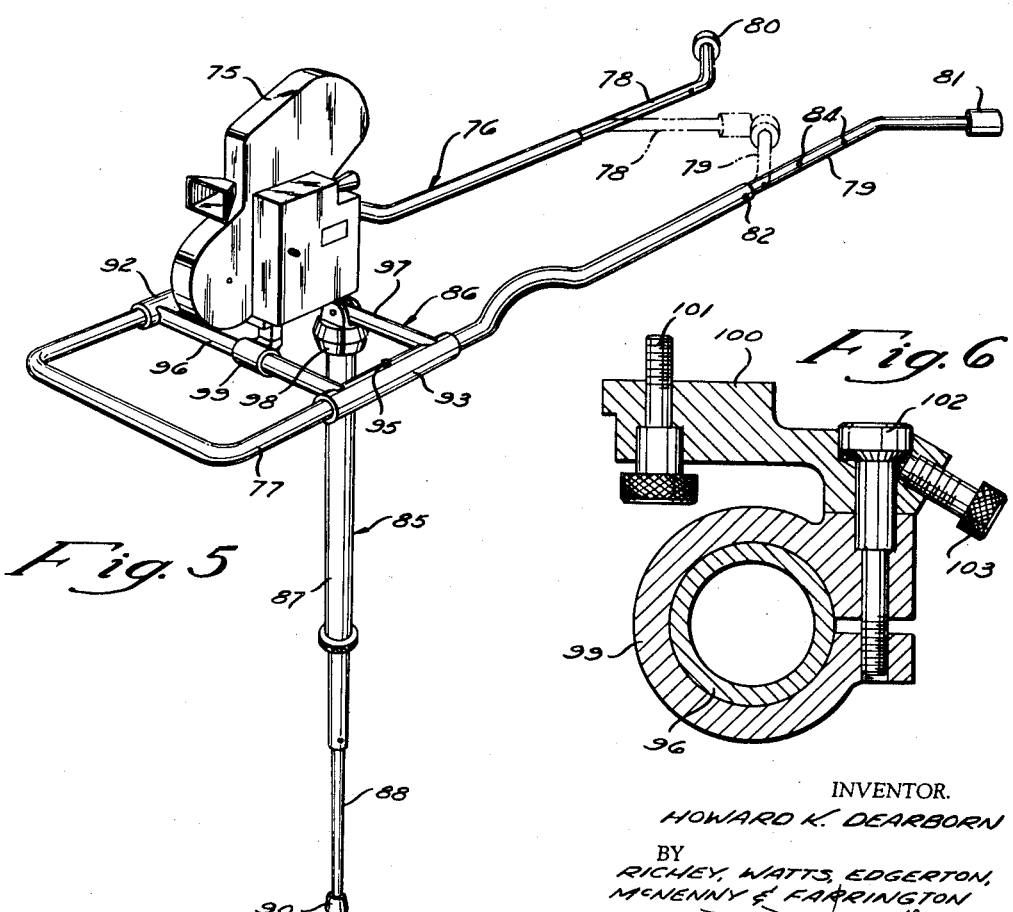
INVENTOR.
HOWARD K. DEARBORN
BY
RICHEY, WATTS, EDGERTON,
McNENNY & FARRINGTON
ATTORNEYS July 19, 1960 H. K. DEARBORN 2,945,428
CAMERA STABILIZER
Filed March 24, 1958 3 Sheets-Sheet 3
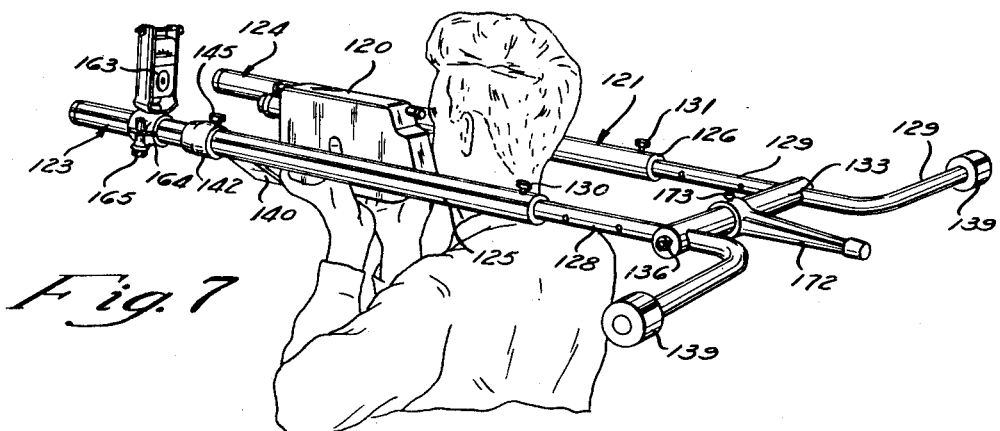
Fig. 7
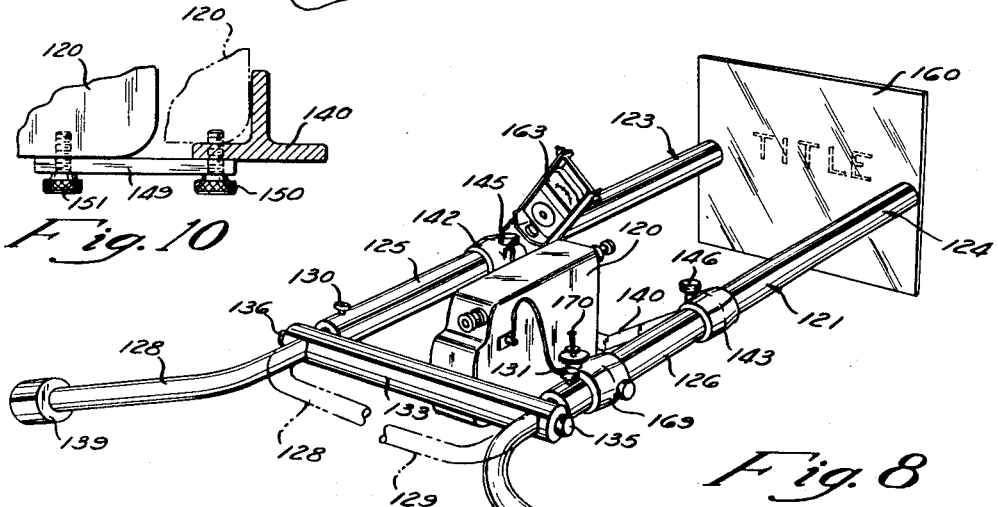
Fig. 10
Fig. 8
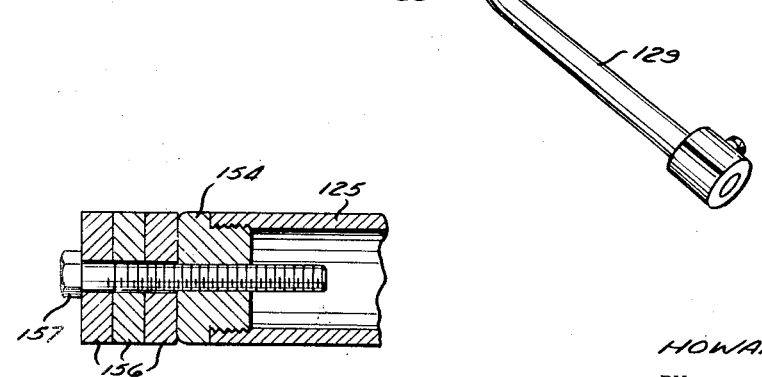
Fig. 9
INVENTOR.
HOWARD K. DEARBORN
BY
RICHEY, WATTS, EDGERTON,
McNENNY & FARRINGTON
ATTORNEYS United States Patent Office 2,945,428
Patented July 19, 1960

2,945,428

CAMERA STABILIZER

Howard K. Dearborn, 31 Manning Drive, Berea, Ohio

Filed Mar. 24, 1958, Ser. No. 723,423

7 Claims. (Cl. 95—86)

The present invention relates generally to the photographic art and is more particularly concerned with a novel apparatus for stabilizing a camera during use and with the unique combination of a camera and means for stabilizing a camera against undesirable motion.

Despite the many technological advances in photography and the generally highly-developed status of this art, practically every amateur and professional photographer is confronted with camera stability as a major problem. Unless the camera is mounted on a tripod on a non-movable foundation or otherwise supported in a stationary position, the results of undesirable camera motion are prominent in both still and moving pictures. In taking still pictures on exposures of a tenth of a second or more, blurring is usually unavoidable when the camera is manually supported. Likewise, movies taken under such circumstances will jiggle due to slight tilting and turning motion of the unstabilized camera. Actually these effects in many cases become so marked as to make moving pictures difficult to look at or see clearly.

The only solution to this problem developed prior to the present invention consists of elaborate, expensive and massive equipment employed in commercial moving picture production and to some extent in television. This equipment, where it is employed to follow outdoor action at close range, frequently requires the construction of a smooth roadbed at substantial cost. However, this equipment is in no way suitable for the amateur or the small independent professional photographer.

According to the present invention it is now for the first time possible to eliminate entirely the detrimental motion effects involved in ordinary still or movie camera use. Thus, for example, it has always been entirely impracticable to take movies with a camera while strolling along the smoothest way, but now pictures of excellent quality can be taken as the photographer participates on much more vigorous activities. I have found in fact that through the use of the novel apparatus of this invention pictures can be taken by a photographer riding on a toboggan, skiing or hiking or climbing in rugged country. I have also found that the same high quality results can be obtained through the use of this equipment by a photographer traveling in a vehicle under circumstances which heretofore would have resulted in moving pictures that could scarcely be followed. A moving picture protographer equipped with apparatus of this invention riding as a passenger on a roller coaster, or in a small boat traveling through choppy or rough water can likewise take pictures that he could not take before. Furthermore, this invention insures panoramic moving pictures of excellent quality in terms of freedom from motion or jerk making the pictures difficult to view.

This invention is predicated upon my surprising discovery that it is possible to produce a certain degree of stability in a camera regardless of its size without actually providing any moving parts and without employing massive or cumbersome equipment.

I have further discovered that this new result can be obtained through the use of any of a wide variety of types of apparatus all having in common the features of carrying and using convenience and the complete lack of moving parts. I have discovered still further that this novel apparatus can be provided with effective support means when the camera equipment to be stabilized is overly burdensome. Such auxiliary or primary support means may take the form of a leg to engage the ground or the floor or it may take the form of an overhead suspension arrangement. Additionally or alternatively it may include lateral support members to prevent or dampen undesirable motion of the assembly from side to side. In a special embodiment of this invention the camera and stabilizer assembly may in effect be floated in a position in an air craft so that pictures taken during gun or rocket firing will not be damaged by camera shock and vibration.

On the basis of the foregoing discoveries I have reached the conclusion that camera motion which is detrimental to moving pictures is relatively quick angular motion. This motion is unnatural to the viewer's eye because even in high velocity travel, or in travel over rough road or rough water, or under similar circumstances, the individual will maintain his eyes reasonably steady against pitching and tossing motion of his body and even of his head. Moving pictures made under such extreme conditions surprisingly are not difficult to follow or straining on the viewer's eye so long as this natural characteristic of the eyes is preserved. Thus all angular motion does not have to be eliminated but must be slowed down in order to produce realistic high quality moving pictures which are accordingly easy on the eye and readily followed. It is merely necessary to approximate reasonably the natural movement of the photographer's eyes as he views the picture subject.

Broadly described, the camera stabilizing apparatus of this invention comprises a frame which has a camera mounting portion and counter-balance means including parts of the frame spaced laterally on each side of the camera mounting portion. In a preferred embodiment of this invention the center of gravity of the frame will be located at a point removed from the camera mounting portion and the mass of the frame will be in proportion to the mass of the camera mounted thereon so that the balance point of the frame is spaced from the camera mounting portion when the camera is mounted on the frame and ready for use.

Also described broadly, in its combination aspect the apparatus of this invention comprises an assembly of a movie camera and a stabilizer for the camera, the stabilizer comprising a frame having a camera mounting portion to which the camera is removably secured in operating position and the frame having balancing masses which are disposed on opposite sides of the apparatus balance point and which aggregate at least twice the mass of the camera.

Those skilled in the art will gain a further and better understanding of this invention from the detailed description of the novel camera stabilizer apparatus and camera assemblies described below, reference being had to the drawings accompanying and forming a part of this specification, in which:

Fig. 1 is a view in perspective of a camera and stabilizer assembly representing a preferred embodiment of this invention, the assembly being illustrated in normal use by the photographer;

Fig. 2 is a view similar to Fig. 1 of the Fig. 1 apparatus equipped with an auxiliary supporting means to distribute the weight of the assembly;

Fig. 3 is a fragmentary, enlarged, sectional view of the forward end of stabilizer frame, showing means for adjusting the position of the camera mounting part of the frame;

Fig. 4 is a perspective view of another camera and stabilizer assembly embodying this invention;

Fig. 5 is a view in perspective of still another camera and stabilizer assembly equipped with a main supporting leg;

Fig. 6 is an enlarged sectional view of the camera mounting device carried by the frame of Fig. 5;

Fig. 7 is a perspective view of a camera and stabilizer assembly embodying another preferred form of this invention;

Fig. 8 is a perspective view of the Fig. 7 assembly in another type of use;

Fig. 9 is an enlarged, fragmentary, sectional view of a front end portion of one of the side members of the stabilizer frame of the Fig. 7 assembly showing the manner in which the weights are secured to that part of the frame; and, Fig. 10 is an enlarged, fragmentary, sectional view of the camera mount of the frame of Fig. 7.

In Fig. 1 movie camera C, suitably of any conventional type on the order of size of a standard 16 mm. camera, is mounted at the forward end of frame F, being securely but removably fastened thereto. Frame F is generally rectangular in plan and of tubular aluminum construction. Its side members 10 and 11 are aluminum tubes and these are spaced part so as to straddle the photographer's shoulders as illustrated. Aluminum tube 13 connects members 10 and 11 together at the end of the frame remote from camera C, these parts being welded so that the frame has the requisite rigidity and strength. At the leading ends of the tubes 10 and 11, plugs 15 (one shown) are provided to close the tubes and provide for vertically adjustable connection to the frame of the camera mounting portion generally designated 16. Plugs 15 have transverse apertures in register with apertures in tubes 10 and 11 to receive vertically disposed members 17 and 18 of assembly 16. These plugs are also provided with threaded axial openings to receive set screws 19 and 20 to retain members 17 and 18 in predetermined desired position according to set screw-receiving recesses 24 formed in the said members, as best illustrated in Fig. 3.

Mounting assembly 16 in addition to members 17 and 18 includes a tubular cross piece 26 disposed transversely of frame F and welded adjacent to its ends to the lower end portions of members 17 and 18. Member 26 carries a camera mounting plate 27 which bears against the front panel of the camera and against the lowermost part of the camera (Fig. 1). A stud 28 holds the camera down firmly against plate 27 as long as the camera is to be carried on the frame, this stud extending vertically upwardly through member 26 and being received in a standard threaded opening (not shown) provided for such purpose in the lower portion of the camera.

Frame F is additionally provided with view finder or sighting means 30 comprising forward and rear sight members 31 and 32 mounted on a cross bar assembly 34 disposed in firm engagement with side members 10 and 11 adjacent to the balance point of the camera and frame assembly. Cross bar assembly 34 is of the clamping type, having upper and lower arms 35 and 36 which are connected together in their midsections by stud 37. Stud 37 also serves to hold sight base 28 in selected position, sight members 31 and 32 being attached to this base and being directed according to the orientation of the base with regard to the position of the camera on the frame. Thus while the camera in this illustrated embodiment is disposed in longitudinal alignment with the frame and base 38 is similarly situated, it will be understood that the camera may be turned at an angle to the frame axis and corresponding angular relationship may be established between base 38 and the frame.

In the use of the Fig. 1 assembly with the camera mounted in the position illustrated or in another desirable position and sight means 30 adjusted and positioned accordingly, the operator may take pictures merely by starting the camera as soon as it has been brought into focus on the subject to be photographed. The operation of the camera may be by remote control as indicated by the lead 40 running from the vicinity of the balance point of the frame, where a lever (not shown) is provided for the operator's use, to the standard camera actuating mechanism mounted on the camera itself. With the assembly carried by the photographer according to the illustration, it will be understood that the photographer can participate in the action to be photographed and by nature of the location of the camera on the frame the method of its attachment thereto and the stabilizing characteristics of the frame, undesirable angular motion of the camera will be controlled within tolerable limits or for all practical purposes essentially eliminated. The eyes of the photographer and the lens of the camera in other words will focus on the same subject and see it in essentially the same way at all times that the camera is in use. The photographer's arms and hands acting as a yoke in supporting and directing the assembly will thus perform the same steadying function that the photographer automatically performs with his neck and eyes as he witnesses the subject scene. For best results, the frame is therefore not rested upon the shoulder of the photographer particularly under circumstances where it would be subject to shock and vibration which is effectively eliminated through the operator's manipulation of the frame through his arms and his hands.

In Fig. 2 the camera and frame assembly of Fig. 1 is equipped with a turret sight assembly 43 mounted on cross bar assembly 34. Also in this embodiment a supporting leg 45 is secured to cross bar assembly 34 to assist the photographer in carrying the camera and its stabilizing frame.

Leg 45 is of tubular, telescoping construction comprising an outer upper tube 46 detachably connected at its upper end to cross bar assembly 34 and an inner lower tube 47 which may be locked in one of several predetermined positions by means 49 including a shock absorbing spring and a set screw carried by tube 46 to engage recesses formed at intervals along the length of tube 47.

Since leg 45 is not sufficiently long to reach the floor or ground on which the photographer stands, a flag carry 50 of conventional design is provided and in use the lower end of tube 47 is received in socket 51 of flag carry 50.

The turret sight assembly is similar to sight assembly 30 of Fig. 1 with the principal exceptions that forward and rear discs 54 and 55 replace sight members 31 and 32 and base member 56 replaces base 38 and is connected to discs 54 and 55 so that they may be rotated on their respective axes according to the requirements of the photographer. Base 56 is mounted on cross bar assembly 34 by means of stud 37 after the manner of base 38 as described above.

In using the apparatus of Fig. 2 the procedure described above with respect to Fig. 1 is followed with the exception that before the pictures are taken, leg assembly 45 is adjusted as to length to meet the photographer's requirements and is mounted in socket 51 of flag carry 50 to aid in carrying at least a substantial part of the frame and camera assembly so that the photographer may more easily perform primary guiding and steadying functions in addition to operating the camera itself.

Referring to Fig. 4, the assembly therein illustrated again includes camera C and a generally U-shaped telescoping and counter-weighted light aluminum frame 60. This frame in addition to the camera mounting cross bar construction to be described, comprises three main parts, that is, a U-shaped tube 61 and counter-weight tubes 62 and 63 which are disposed partially within the open ends of tube 61 and secured in position with respect to tube 61 and to camera C according to the requirements of the photographer as to the location of the assembly balance point.

Tube 61 is contoured in its midportion to receive the photographer's shoulders, not to make it easy for the photographer to rest the frame on his shoulders but to avoid the necessity for locating the camera at a point below the plane of the main portion of the frame in contrast to the embodiments shown in Figs. 1 and 2. In this case the photographer may sight directly through the eye piece of the camera and auxiliary sighting means such as sight assemblies 30 and 43 are eliminated.

Counterbalance members 62 and 63 carry weights 64 and 65 respectively at their ends and these members are built to define obtuse angles whereby weights 64 and 65 in use can be disposed laterally beyond the outer limits of frame member 61 to increase camera stability. When not in use, these weights may be directed inwardly as will be described in order to reduce frame storage space requirements.

The mounting assembly for camera C is similar to that described above and accordingly includes an upper and a lower cross bar 67 and 68 clamped together, gripping between their opposed sides of member 61. Studs 69, 70 and 71 hold the cross bars in assembled relation firmly gripping member 61 to prevent displacement of the camera with respect to the frame. A mounting plate 72 serves to hold the camera in place against the upper surface of upper cross bar 67 by means of stud 70 and the camera is held firmly against plate 72 by any suitable means such as a camera mounting stud assembly (not shown).

The assembly shown in Fig. 5 includes a large movie camera 75 and a generally U-shaped telescoping tubular aluminum frame 76 upon which the camera is adjustably and detachably mounted as will be described. Frame 76 is similar to frame 60 having a unitary main body 77 contoured in approximately its midsection on each side to receive the shoulders of the photographer so as to avoid the necessity for dropping the camera below the horizontal plane of the frame for convenience in sighting the camera. Frame 76 like frame 60 includes in addition two telescoping tubular tail pieces 78 and 79 similar in form to members 62 and 63 of frame 60. These tail pieces are provided with weights 80 and 81 respectively at their free ends and thus are constructed not only to be received in the ends of the body 77 but also to be rotatable relative to body 77 for maximum stability for use and minimum storage space requirements. The withdrawn or retracted position of members 78 and 79 is indicated in outline in Fig. 5 while the normal operating position is shown in full view. Suitable means including studs or set screws 82 (one shown) are provided to maintain members 78 and 79 in predetermined position. Recesses 84 are formed at intervals along the lengths of members 78 and 79 to receive the set screw after the manner illustrated generally in Fig. 3.

Support means for the camera and frame assembly comprises a depending leg 85 and a cross head 86 to which leg 85 is pivotally connected as will be described in detail. Leg 85 is of telescoping construction like leg 45 of Fig. 2 and is provided with shock absorbing or cushioning means suitably as illustrated in Fig. 7. Upper tubular member 87 of enlarged diameter receives in its lower end lower member 88 and the latter is provided at its lower end with a rubber crutch tip piece 90 to engage the ground or other supporting surface.

Cross head 86 is mounted on frame 76 in such a manner that the cross head and camera 75 together with leg 85 can be moved lengthwise along a portion of the frame. The cross head thus is of tubular construction having side members 92 and 93 receiving opposed side portions of frame body 77 and having a locking screw 95 to secure the cross head in predetermined location with respect to the frame. Side members 92 and 93 are joined by two spaced tubular cross members 96 and 97 which serve respectively as camera supporting element and the anchor for leg 85. Cross members 96 and 97 may be welded at their ends to the side members of the cross head to provide a strong and rigid construction. Leg 85 is connected to member 97 by means of a socket fitting 98, the upper end of member 87 being provided with a ball (not shown) for receipt in fitting 98.

In Fig. 6 the unique camera mounting device indicated generally in Fig. 5 is shown in detail. This device consists of a clamp 99 which fits over and grips cross member 96 and a camera mounting bed plate 100 which is carried by the clamp 99. Three studs 101, 102, and 103 complete this assembly and serve respectively to fasten the camera to plate 100, to close clamp 99 in gripping engagement with cross member 96 and to secure plate 100 against motion relative to clamp 99. Three different adjustability features thus are provided for the camera in this unique mounting device, a special feature of which is the novel relationship between stud 103 and 102 whereby stud 102 performs two functions at the same time. Stud 102 not only operates clamp 99 and maintains it at any desired position or condition with respect to cross member 96 but also acts as a part of clamp 99 functioning as an abutment in effect against which stud 103 acts to prevent movement of plate 100 around the vertical axis defined by the center line of stud 102. In another embodiment of this invention a camera and frame assembly suitably of the type shown in Fig. 1 is provided with overhead suspension means so that all or virtually all the weight of the assembly is supported by the overhead structure. The photographer merely guides or aims the apparatus and steadies it against undesirable lateral and rocking motion. Most simply the suspension means will comprise a sling fastened to side members of the frame at a location where the assembly balance point will normally be established for the convenience of the operator. This sling will be provided with a hook or hanger element to be received in an eye mounted in the roof of a vehicle or vessel for this purpose.

In a modification of this overhead suspension system it is contemplated that a lateral support means may also be provided to prevent undesirable swaying of the assembly during use. This lateral support means may suitably take the form of a pair of straps adjustable in length and provided with loops to be hung on hooks disposed on opposite sides of the photographer.

In still another embodiment of this invention an assembly of this invention of special utility as applied to the very light movie cameras such as the 8 mm. cameras, weighing four pounds or less, comprises a stabilizing frame which consists essentially of a cross bar disposed with its long dimension at substantially right angles to the focusing axis of the camera. This frame is rigidly attached to the camera as described above and it performs the novel balancing and stabilizing function of this invention by providing balancing masses on opposite sides of the balance point of the assembly including the camera, these balancing masses aggregating not less than twice the mass of the camera itself. As a practical matter, in order to effect real stabilizing results the balancing masses of this frame should be centered in each instance at least one foot from the camera. It may be noted that this general requirement is met in the frames illustrated herein and described above. However, where the frame does not extend forwardly or rearwardly of the camera but only laterally therefrom on each side, it is important that the masses each have a moment of inertia located at least one foot from the longitudinal balance point of the camera and frame assembly. A camera assembly of this type may be carried by the photographer by means of a single handle which is joined to the frame by a yoke attached to the frame on opposite sides of the camera mounting portion thereof. Alternatively the photographer may carry the assembly by gripping the cross bar on either side of the camera and thereby provide through his own arms and body the yoke structure and function.

It will be understood that it is not necessary in this last embodiment that the balancing masses be of the same order of magnitude in a given frame. In this connection due regard is given to the effect of lever length in relation to mass. In no instance, however, is it contemplated that the center of a balancing mass of one of these frames be located closer to the camera mounting portion of the frame than the limit stated above, that is, one foot. There is in theory no maximum limit upon this spacing factor or lever length, but there is a practical limitation imposed by the requirements of the photographer who will use the equipment in the field.

It will further be understood that regardless of the type of stabilizing frame employed to obtain the new results of this invention, it is not essential or in all instances particularly desirable that the frame be more or less monoplane and built for disposition substantially parallel to the ground on which the photographer stands. Counterbalance masses need not be disposed below the camera or above it, nor do they necessarily have to be disposed in a common plane. Furthermore, they may be disposed on one side forwardly of the camera and on the other side rearwardly thereof as regards the centers or moments of inertia of these masses.

The assembly illustrated in Figs. 7 and 8 includes a movie camera 120 and a stabilizer 121 and incorporates a number of the alternative special features described above. Thus the counterbalance masses are distributed forwardly and rearwardly of the camera and some of them are located laterally at substantial distances from the camera and in different horizontal planes. The masses are, furthermore, of different magnitudes and adjustable as to both location and magnitude whereby the center of gravity or point or axis of balance of the assembly can readily be adjusted to meet the operator's requirements.

Stabilizer 121 comprises a generally rectangular frame which is open at the front end and has telescoping side members so that the frame may be extended rearwardly to increase substantially its length and stabilizing effect. Side members 123 and 124 comprise outer tubes 125 and 126 spaced apart and disposed parallel to each other with the ends in common transverse planes. Inner nested or telescoping tubes 128 and 129 of outside diameter approximating the inside diameter of the outer tubes and slidably and rotatably disposed within the respective outer tubes and secured in any predetermined condition of frame extension by means of set screws 130 and 131 carried by tubes 125 and 126, respectively, adjacent to their trailing ends. A tie bar 133 closes one end of the stabilizer frame, spanning the space between the side members and receiving tubes 128 and 129 which extend therethrough. Tie bar 133 may be shifted lengthwise of tubes 128 and 129 but in normal use of the frame will be secured in position relative to the tubes by bolt 135 extending axially through the tie bar and through registered apertures in tubes 128 and 129, and by nut 136 screwed on one end of the bolt.

Tubes 128 and 129 have trailing end portions which are turned at substantially right angles to tubes 125 and 126 and at their rear extremity each of these inner tubes are fitted with weights 139. These weights are temporarily secured to the tubes by set screw means, the weights being formed to receive the ends of said tubes.

The camera mount of this frame comprises a cross bar 140 in the form of a casting of T-shape in cross section and having end portions 142 and 143 to receive outer tubes 125 and 126. Cross bar 140 thus is slideable along the frame and by means of set screws 145 and 146 carried by this bar and engageable with the side members, the camera mount may be secured in any desired location lengthwise of tubes 125 and 126. The casting has a drop center portion which in Figs. 7 and 8 is disposed below the frame so that camera 120 can be easily sighted directly, as indicated in Fig. 7, without the side members impairing the photographer's movements in operating the camera.

As shown in Fig. 10, a mounting bar or bracket 149 is detachably secured to the central part of cross bar 140 by means of stud 150. Bracket 149 extends rearwardly of the frame and camera 120 is firmly attached to it by another stud 151. Under some conditions and with some types of cameras, the bracket may not be necessary and the camera may be secured directly to the cross bar, as indicated in outline in Fig. 10.

Weights for stabilizing and balancing effects are provided at the leading end of the frame. In Fig. 9 one of these weights is shown assembled with tube 125. A plug 154 is screwed into the open end of the tube and weights in the form of metal washers 156 are secured to the plug by a bolt 157 screwed into said plug.

A screen 160 can readily be fastened to the frame, as shown in Fig. 8, for the purpose of making titles or foregrounds in either stationary or moving shots. The screen is provided with apertures to receive bolt 157 and thus is mounted on the frame in the same manner as weights 156.

Light meter 163 is attached to the frame by a split-ring bracket 164 provided with an adjusting stud 165 so that the bracket may be moved and located along the length of tube 125 or 126 and at any desired angular position of the light meter.

Another split-ring bracket 169 serves as a mount for a cable release 170 for camera 120. Bracket 169 is also slideable along tube 126 and rotatable to the desired position for the photographer's convenience.

When the frame is to be used as a tripod, a center pivot leg 172 may be secured to tie bar 133, as shown in outline in Fig. 7. Leg 172 is a casting and it is formed with a transverse opening to receive the tie bar and provided with a screw 173 to secure the leg firmly in position with respect to the frame.

In use the assembly of Figs. 7 and 8 will normally be in either of the positions and conditions illustrated, depending upon whether the photographer is to carry the assembly or rest it upon a supporting structure such as the top of a table. In the latter case tubes 128 and 129 will be turned downwardly to the extent required to make the camera assume the desired angle to the object to be photographed. However, as above indicated, these tubes may be thus disposed in use in the field when the photographer is carrying the assembly, or they may be turned into an upwardly directed position. They may even be turned inwardly of the frame as the outline in Fig. 8 shows so that they are folded one over another. This latter condition, however, is the usual carrying position, the frame being telescoped to conserve space.

Having thus described this invention in such full, clear, concise and exact terms as to enable any person skilled in the art to which it pertains to make and use the same, and having set forth the best mode contemplated of carrying out this invention, I state the subject matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. Apparatus for use in photography to carry a camera and afford control and stability for the camera in use so that horizontal and vertical angular movement of the camera producing blurring or detrimental motion effects in the resulting pictures can be substantially eliminated, said apparatus comprising a hand supported frame adapted to be carried in one's hands at a level above one's shoulders, said frame having a camera mounting portion and counterbalance means comprising elongated substantially parallel side members spaced apart to receive the head of the operator and extending rearwardly from the camera mounting portion, the center of gravity of the frame being at a location removed from said camera mounting portion and along the length of the side members and the mass of the frame being in proportion to the mass of the camera so that the balance point of the frame is spaced from the camera mounting portion when a camera is mounted on the frame.

2. The combination of elements set forth in claim 1 in which a leg member is connected to the frame rearwardly of the cross bar for the camera to support a part of the load of the frame and camera.

3. Apparatus for use in photography to carry a camera and afford control and stability for the camera in use so that horizontal and vertical angular movement of the camera producing blurring or detrimental motion effects in the resulting pictures can be substantially eliminated, said apparatus comprising a hand supported frame adapted to be carried in one's hands at a level above one's shoulders, said frame having a camera mounting portion and adjustable telescoping counterbalance means comprising elongated, substantially parallel side members spaced apart to receive the head of an operator and weights carried at the ends of the side members remote from the camera mounting portion, the center of gravity of the frame being at a selected location removed from said camera mounting portion and the distribution of the mass of the frame being in proportion to the mass of the camera so that the balance point of the frame is spaced from the camera mounting portion when a camera is mounted on the frame.

4. Apparatus for use in photography to carry a camera and afford control and stability for the camera in use so that horizontal and vertical angular movement of the camera producing blurring or detrimental motion effects in the resulting pictures can be substantially eliminated, said apparatus including a hand supported frame adapted to be carried in one's hands at a level above one's shoulders, said frame comprising spaced elongated, substantially parallel side members spaced apart to receive the head of an operator, hand grip portions intermediate the ends of said side members, a camera mounting front cross member connected to the side members, ahead of said grip portions, and weights connected to the side members rearwardly of said grip portions, the center of gravity of the frame being at a location removed from said camera mounting portion and the mass of the frame being in proportion to the mass of the camera so that the balance point of the frame is spaced from the camera mounting portion when a camera is mounted on the frame, and a leg member secured to the frame and disposed for engagement with a support below the frame during use of a camera carried by the frame.

5. Apparatus for use in photography to carry a camera and afford control and stability for the camera in use so that horizontal and vertical angular movement of the camera producing blurring or detrimental motion effects in the resulting pictures can be substantially eliminated, said apparatus including a generally rectangular frame adapted to be supported in one's hands above the level of one's shoulders, said frame being open at one end and comprising telescoping side members adjustable in length and a cross member connected to the side members for attachment of a camera to the frame, each side member including an outer tube and an inner tube extending coaxially into the outer tube, and means for securing the inner and outer tube of each side member in a position relative to each other so that the balance point of the frame is spaced from the said cross member when a camera is mounted on the frame.

6. Apparatus for use in photography to carry a camera and afford control and stability for the camera in use so that horizontal and vertical angular movement of the camera producing blurring or detrimental motion effects in the resulting pictures can be substantially eliminated, said apparatus including a hand supported frame adapted to be carried in one's hands at a level above one's shoulders, said frame having spaced side members to straddle the head of a photographer and a cross member at the forward end connected to the side members to carry a camera, the balance point of the frame being spaced from the camera mounting portion when a camera is mounted on the said cross member, and sight means adjustably mounted on the frame at a location spaced rearwardly from the said cross member.

7. Apparatus for use in photography to carry a camera and afford control and stability for the camera in use so that horizontal and vertical angular movement of the camera producing blurring or detrimental motion effects in the resulting pictures can be substantially eliminated, said apparatus including a hand supported frame adapted to be carried in one's hands at a level above one's shoulders, said frame comprising a main body having spaced side members to straddle the head of a photographer and a cross member connected to the side members to carry a camera, the frame main body having hand grip portions in the side member spaced from the cross member and the frame including parts movable relative to and carried by the main body to shift the center of gravity of the frame and to locate the balance points of an assembly of the frame and camera in the hand grip portions.

References Cited in the file of this patent

UNITED STATES PATENTS

| | | |
|---|---|---|
| 1,971,486 | Jennings | Aug. 28, 1934 |
| 2,552,205 | Moss | May 8, 1951 |
| 2,746,369 | Beard | May 22, 1956 |
| 2,806,416 | Jones | Sept. 17, 1957 |
| 2,873,645 | Horton | Feb. 17, 1959 |